United States Patent
Kim et al.

(10) Patent No.: US 11,881,987 B2
(45) Date of Patent: *Jan. 23, 2024

(54) METHOD AND APPARATUS FOR BEAM FAILURE RECOVERY IN COMMUNICATION SYSTEM

(71) Applicant: ELECTRONICS AND TELECOMMUNICATIONS RESEARCH INSTITUTE, Daejeon (KR)

(72) Inventors: Min Hyun Kim, Busan (KR); Sung Hyun Moon, Daejeon (KR); Jung Hoon Lee, Daejeon (KR); Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,868

(22) Filed: Nov. 21, 2022

(65) Prior Publication Data

US 2023/0085151 A1    Mar. 16, 2023

Related U.S. Application Data

(63) Continuation of application No. 16/977,750, filed as application No. PCT/KR2019/001802 on Feb. 14, 2019, now Pat. No. 11,539,575.

(30) Foreign Application Priority Data

Mar. 12, 2018 (KR) .......................... 10-2018-0028699
Mar. 22, 2018 (KR) .......................... 10-2018-0033158

(51) Int. Cl.
*H04L 41/0668* (2022.01)
*H04L 5/00* (2006.01)
(Continued)

(52) U.S. Cl.
CPC ........ *H04L 41/0668* (2013.01); *H04L 5/0048* (2013.01); *H04L 43/16* (2013.01);
(Continued)

(58) Field of Classification Search
CPC ... H04L 41/0668; H04L 5/0048; H04L 43/16; H04W 28/0278; H04W 72/046;
(Continued)

(56) References Cited

U.S. PATENT DOCUMENTS 9,144,100 B2    9/2015  Narasimha et al.
9,363,683 B2    6/2016  Raghavan et al.
(Continued)

FOREIGN PATENT DOCUMENTS

WO    2017024516 A1    2/2017

OTHER PUBLICATIONS

Search Report, dated Jun. 12, 2019, for International Application No. PCT/KR2019/001802.
(Continued)

*Primary Examiner* — Rownak Islam
(74) *Attorney, Agent, or Firm* — LRK PATENT LAW FIRM

(57) ABSTRACT

Disclosed are a method and an apparatus for beam failure recovery in a communication system. The method for beam failure recovery includes the steps of: searching for a plurality of candidate beams when a beam failure is detected; transmitting a beam failure recovery request signal to a base station by using beam #1 of the plurality of candidate beams; receiving a beam failure recovery response signal in response to the beam failure recovery request signal via
(Continued)

beam #1 from the base station; and transmitting an SR requesting a resource for transmission of multi-beam setting information to the base station, wherein the multi-beam setting information includes indexes of one or more beams excluding beam #1 of the plurality of candidate beams. Therefore, performance of the communication system can be improved.

20 Claims, 11 Drawing Sheets

(51) Int. Cl.
*H04L 43/16* (2022.01)
*H04W 28/02* (2009.01)
*H04W 72/044* (2023.01)
*H04W 74/08* (2009.01)
*H04W 72/20* (2023.01)
*H04W 72/23* (2023.01)

(52) U.S. Cl.
CPC ..... *H04W 28/0278* (2013.01); *H04W 72/046* (2013.01); *H04W 72/20* (2023.01); *H04W 72/23* (2023.01); *H04W 74/0833* (2013.01)

(58) Field of Classification Search
CPC . H04W 72/20; H04W 72/23; H04W 74/0833; H04W 72/21; H04W 24/10; H04B 7/0695
USPC ........................................................ 370/225
See application file for complete search history.

(56) References Cited

U.S. PATENT DOCUMENTS

| | | |
|---|---|---|
| 9,414,285 B2 | 8/2016 | Hampel et al. |
| 9,907,093 B2 | 2/2018 | Park et al. |
| 11,122,642 B2* | 9/2021 | Zhou ..................... H04L 1/1819 |
| 2014/0073337 A1 | 3/2014 | Hong et al. |
| 2017/0208488 A1 | 7/2017 | Hwang et al. |
| 2017/0272998 A1 | 9/2017 | Choi et al. |
| 2017/0288763 A1 | 10/2017 | Yoo et al. |
| 2018/0006770 A1 | 1/2018 | Guo et al. |
| 2018/0367374 A1* | 12/2018 | Liu ........................ H04W 16/28 |
| 2022/0376769 A1* | 11/2022 | Xiong ..................... H04B 7/088 |

OTHER PUBLICATIONS

Written Opinion, dated Jun. 12, 2019, for International Application No. PCT/KR2019/001802.
Samsung, "Beam failure recovery", 3GPP TSG RAN WG1 Meeting 90bis, R1-1717606, Prague, Czech Oct. 9-13, 2017.
Huawei, Hisilicon, "Remaining details on beam failure recovery", 3GPP TSG RAN WG1 Meeting 91, R1-1719423, Reno, USA, Nov. 27-Dec. 1, 2017.
NEC, "Discussions on beam reporting", 3GPP TSG RAN WG1 Meeting #91, R1-1720573, Reno, United States, Nov. 27-Dec. 1, 2017.
CATT, CATR, "Beam recovery and RLF", 3GPP TSG-RAN WG2 Meeting #99, R2-1711770, Berlin, Germany, Aug. 21-25, 2017, Resubmission of R2-1707892.

* cited by examiner

METHOD AND APPARATUS FOR BEAM FAILURE RECOVERY IN COMMUNICATION SYSTEM

CROSS-REFERENCE TO RELATED APPLICATIONS

The present application is a continuation of U.S. patent application Ser. No. 16/977,750, filed on Sep. 2, 2020, which is a U.S. National Phase entry from International Application No. PCT/KR2019/001802, filed Feb. 14, 2019, which claims priority to Korean Patent Application Nos. 10-2018-0028699, filed Mar. 12, 2018, and 10-2018-0033158, Mar. 22, 2018, the disclosure of which is incorporated by reference herein in their entirety.

BACKGROUND

1. Field of the Invention

The present invention relates to a technique for beam failure recovery, and more particularly, to a technique for beam failure recovery for one or more beams in a communication system.

2. Description of Related Art

With the development of information and communication technology, various wireless communication technologies are being developed. Typical wireless communication technologies include long term evolution (LTE), new radio (NR), etc. defined in the $3^{rd}$ generation partnership project (3GPP) standard. The LTE may be one of fourth generation (4G) wireless communication technologies, and the NR may be one of fifth generation (5G) wireless communication technologies.

The 5G communication system (hereinafter, a NR communication system) using a higher frequency band (e.g., a frequency band of 6 GHz or higher) than a frequency band (e.g., a frequency band lower below 6 GHz) of the 4G communication system is being considered for processing of soaring wireless data after commercialization of the 4G communication system (e.g., communication system supporting the LTE). The 5G communication system may support enhanced Mobile BroadBand (eMBB), Ultra Reliable Low Latency Communication (URLLC), massive Machine Type Communication (mMTC), and the like.

In the 5G communication system, a communication node (e.g., a base station and a terminal) may perform communications in a beam-forming scheme using one or more beams. A beam failure may occur according to a change of a surrounding environment of the communication node, and a beam failure recovery procedure is introduced in the 5G communication system to solve this problem. The beam failure recovery procedure may include a beam failure detection step, a new candidate beam identification step, a beam failure recovery request step, and a beam failure recovery response step. However, detailed operations in the steps for the beam failure recovery procedure are not clearly defined. In particular, a beam failure recovery procedure for a plurality of beams is not yet clearly defined.

SUMMARY

The present invention is directed to providing a method and an apparatus for beam failure recovery for one or more beams in a communication system.

A beam failure recovery method, according to a first embodiment of the present invention for achieving the above-described objective, may comprise searching for a plurality of candidate beams when a beam failure is detected; transmitting a beam failure recovery request signal to a base station using a beam #1 among the plurality of candidate beams; receiving from the base station a beam failure recovery response signal that is a response to the beam failure recovery request signal through the beam #1; transmitting an SR to the base station, the SR requesting a resource for transmission of multi-beam configuration information including index(es) of one or more beams excluding the beam #1 among the plurality of candidate beams; receiving a UL grant from the base station, the uplink grant being a response to the SR; and transmitting the multi-beam configuration information to the base station using a resource indicated by the UL grant.

Here, the beam failure may be detected based on a measurement result of a first reference signal configured by the base station, and the first reference signal may have a QCL relationship with a DM-RS of a control channel between the base station and the terminal.

Here, the beam failure may be determined to be detected when error rates of all beams used for transmitting and receiving a control channel between the terminal and the base station are larger than a preconfigured threshold, and when a part of all the beams are received within a monitoring period and error rates of the part of all the beams are larger than the preconfigured threshold, a PHY entity of the terminal may transmit to a MAC entity of the terminal a flag indicating resetting of a timer without increasing a counter indicating a number of occurrences of beam failure instances.

Here, the beam failure may be determined to be detected when error rates of all beams used for transmitting and receiving a control channel between the terminal and the base station are larger than a preconfigured threshold, and when at least one beam among all the beams is received within a monitoring period, a PHY entity of the terminal may transmit to a MAC entity of the terminal information indicating a beam(s) having an error rate larger than the preconfigured threshold.

Here, the plurality of candidate beams may be searched based on measurement results of second reference signals configured by the base station, and each of the second reference signals may have a QCL relationship with a DM-RS of a control channel between the base station and the terminal.

Here, the beam failure recovery request signal may be transmitted through a PRACH associated with the second reference signal.

Here, the beam failure recovery response signal may be received through a CORESET configured by the base station.

Here, the multi-beam configuration information may further include at least one of information indicating that multiple beams can be configured and information of qualities of the one or more beams.

Here, the multi-beam configuration information may be transmitted to the base station through a MAC CE.

A beam failure recovery method, according to a second embodiment of the present invention for achieving the above-described objective, may comprise searching for a plurality of candidate beams when a beam failure is detected; transmitting a beam failure recovery request signal to a base station using a beam #1 among the plurality of candidate beams; receiving from the base station a beam failure recovery response signal including a UL grant through the beam #1; and transmitting to the base station multi-beam configuration information including index(es) of one or more beams excluding the beam #1 among the plurality of candidate beams, by using a resource indicated by the UL grant.

Here, the method may further comprise, after receiving the beam failure recovery response signal, receiving a medium access control (MAC) control element (CE) requesting reporting of the multi-beam configuration information from the base station, wherein the multi-beam configuration information is transmitted when the MAC CE is received.

Here, the beam failure may be detected based on a measurement result of a first reference signal configured by the base station, and the first reference signal may have a QCL relationship with a DM-RS of a control channel between the base station and the terminal.

Here, the plurality of candidate beams may be searched based on measurement results of second reference signals configured by the base station, and each of the second reference signals may have a QCL relationship with a DM-RS of a control channel between the base station and the terminal.

Here, the multi-beam configuration information may further include at least one of information indicating that multiple beams can be configured and information of qualities of the one or more beams.

Here, the multi-beam configuration information may be transmitted to the base station together with a BSR.

A beam failure recovery method, according to a third embodiment of the present invention for achieving the above-described objective, may comprise searching for a plurality of candidate beams when a beam failure is detected; transmitting a first beam failure recovery request signal to a base station using a beam #1 among the plurality of candidate beams; receiving from the base station a first beam failure recovery response signal that is a response to the first beam failure recovery request signal through the beam #1; transmitting a second beam failure recovery request signal to the base station using a beam #2 among the plurality of candidate beams; and receiving from the base station a second beam failure recovery response signal that is a response to the second beam failure recovery request signal through the beam #2.

Here, the beam #1 may be searched based on a measurement result of a first reference signal configured by the base station, the first reference signal may have a QCL relationship with a DM-RS for a control channel between the base station and the terminal, and the first beam failure recovery request signal may be transmitted through a first PRACH associated with the first reference signal.

Here, the first PRACH may be configured for the beam #1 and a beam #3 among the plurality of candidate beams, and the first beam failure recovery request signal may be a signal for requesting recovery of the beam #1 and the beam #3 which are associated with the first PRACH.

Here, the first PRACH may be configured independently of a second PRACH through which the second beam failure recovery request signal.

Here, configuration information of a PRACH used for recovery of beam failures of two or more beams among the plurality of candidate beams may be received from the base station through an RRC message.

Advantageous Effects

According to the present invention, when a beam failure instance occurs in a beam among a plurality of beams, a physical (PHY) layer entity of a terminal may transmit to a medium access control (MAC) layer entity of the terminal a flag indicating resetting of a timer without increasing a counter or information indicating the beam in which the beam failure instance has occurred. In this case, the MAC layer entity of the terminal may reset the timer without increasing the counter based on the information received from the PHY layer entity. Accordingly, even when a plurality of beams are used between the base station and the terminal, a beam failure can be accurately detected.

Further, since a plurality of beams can be recovered in the beam failure recovery procedure, a separate configuration procedure for configuring the plurality of beams may not be performed. Therefore, a plurality of beams can be quickly configured between the base station and the terminal, and the performance of the communication system can be improved.

DETAILED DESCRIPTION OF THE INVENTION

Figure 1:
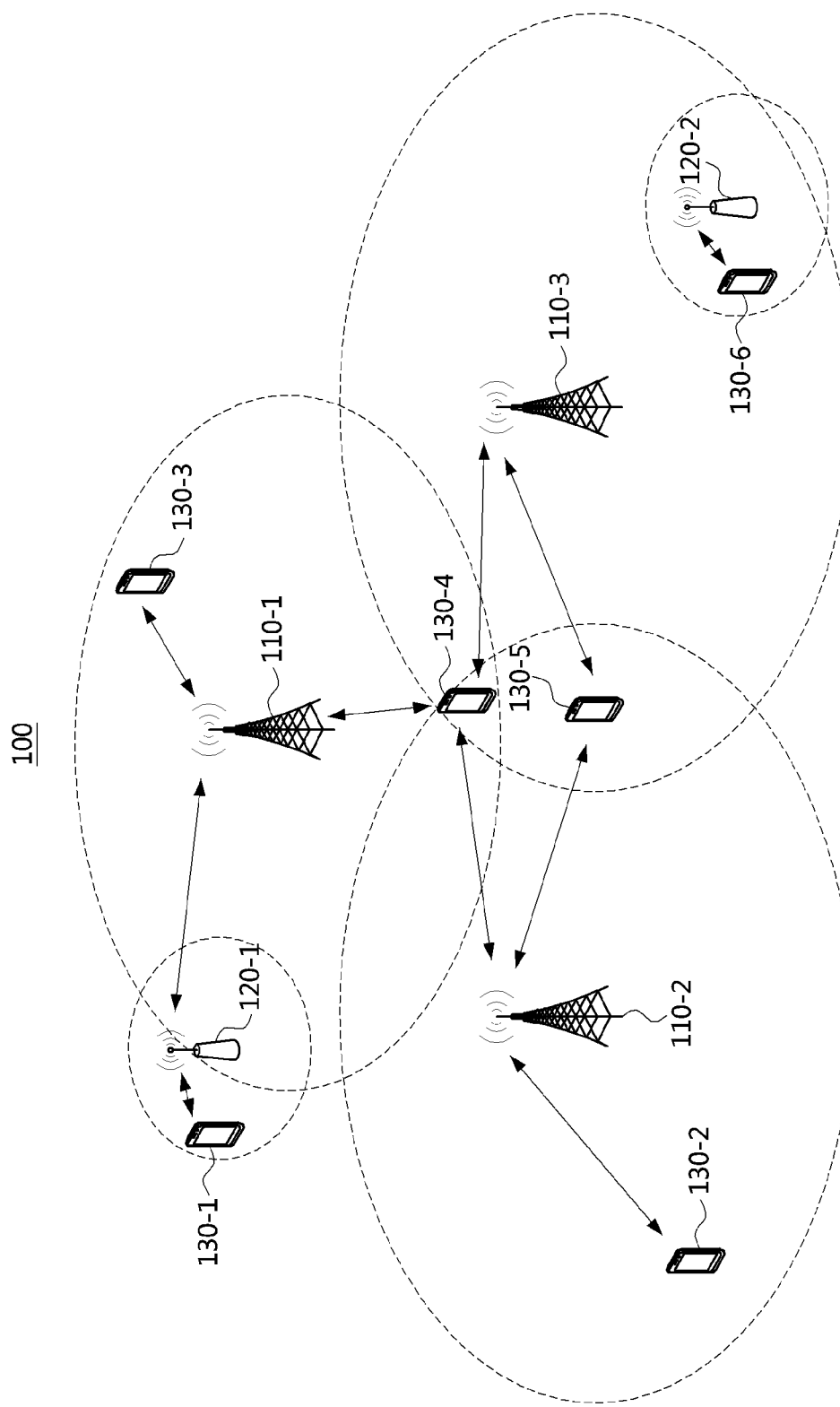
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another.

For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
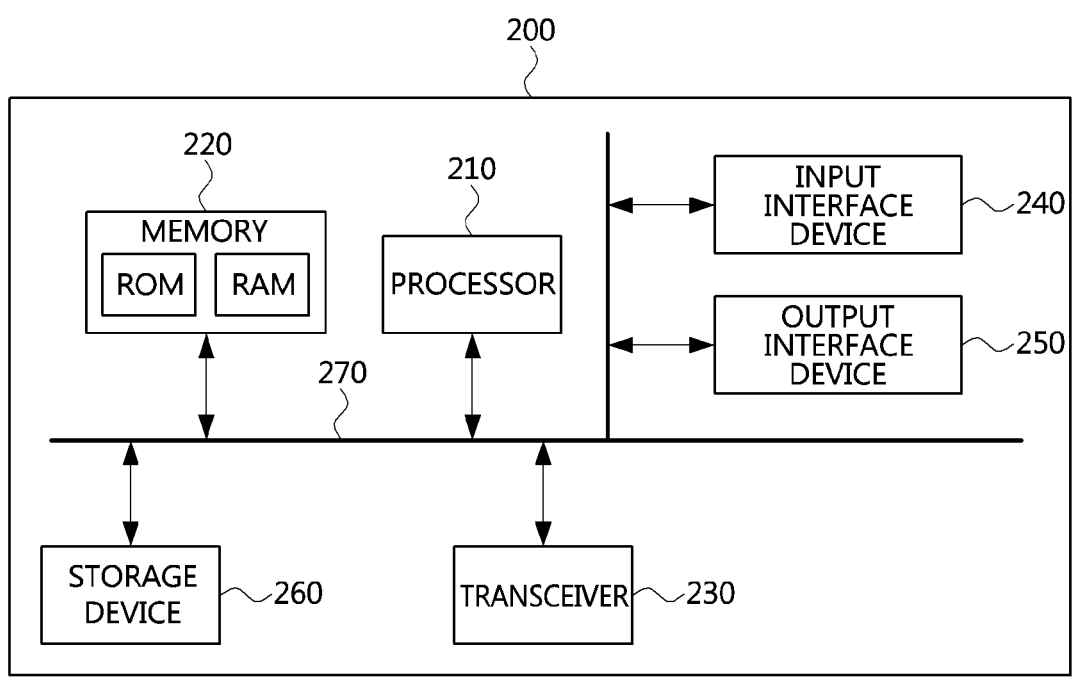
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, a beam failure recovery procedure in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The embodiments below may be applied to other communication systems (e.g., 4G communication systems) as well as a 5G communication system. Also, in the embodiments below, physical channels and signals may be used in the 5G communication systems and other communication systems (e.g., 4G communication systems).

The communication system (e.g., 5G communication system) may operate in a high frequency band, and the diffraction characteristic and the reflection characteristic of the radio wave are poor in the high frequency band. Thus, a propagation loss (e.g., path loss, reflection loss, and the like) in the high frequency band may be larger than a propagation loss in a low frequency band. In this case, a cell coverage of a communication system supporting the high frequency band may be smaller than a cell coverage of a communication system supporting the low frequency band. In order to solve such the problem, a beamforming scheme based on a plurality of antenna elements may be used to increase the cell coverage in the communication system supporting the high frequency band.

A beam management procedure may be introduced for communications based on the beamforming scheme. The beam management procedure may include an initial beam establishment procedure, a beam adjustment procedure, and a beam failure recovery procedure.

The communications between the base station and the terminal may be performed using a beam. During the communications between the base station and the terminal, the beam may be blocked due to rotation of the terminal, movement of the terminal, mismatch of directions of beams between the base station and the terminal, or occurrence of an obstacle. In this case, a quality of a radio link between the base station and the terminal may be rapidly deteriorated. When the quality of the radio link degrades in a data channel (e.g., a physical downlink shared channel (PDSCH)), the terminal may perform the beam management procedure through a control channel (e.g., a physical downlink control channel (PDCCH)), and select a beam having a radio link of good quality. However, when the quality of the radio link degrades in a control channel, the terminal may not receive a control signal from the base station. In this case, the communications between the base station and the terminal may become impossible, and this situation may be defined as a 'beam failure'.

In a communication system supporting multiple beams, a control channel may be transmitted using multiple beams. A beam failure may occur in a part of the multiple beams. Alternatively, a beam failure may occur in all beams used for transmission of the control channel. A beam failure at some beams may be defined as a 'partial beam failure', and a 'beam failure' may mean a beam failure at all beams used for transmission of the control channel.

The beam failure may mean that the radio link between the base station and the terminal is disconnected, and a procedure for managing and recovering the beam failure (e.g., beam failure recovery procedure) is needed. The beam failure recovery procedure may be performed as follows.

Figure 3:
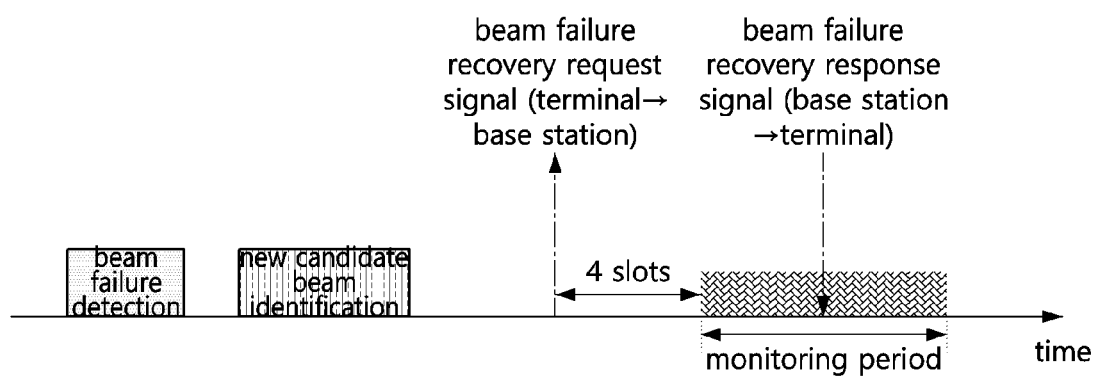
FIG. 3 is a timing diagram illustrating a first embodiment of a beam failure recovery procedure in a communication system.

FIG. 3 is a timing diagram illustrating a first embodiment of a beam failure recovery procedure in a communication system.

Referring to FIG. 3, a beam failure recovery procedure may be configured in four steps. For example, the beam failure recovery procedure may include a beam failure detection step, a new candidate beam identification step, a beam failure recovery request step, and a beam failure recovery response step. The beam failure recovery procedure may vary depending on a transmission scheme of a beam failure recovery request signal. The beam failure recovery request signal may be transmitted using a contention-free random access (RA) scheme, a contention-based RA scheme, or a physical uplink control channel (PUCCH) based scheme.

The terminal may receive a reference signal (e.g., channel state information reference signal (CSI-RS), demodulation-reference signal (DM-RS), a phase tracking RS (PT-RS), a cell-specific reference signal (CRS), etc.) or a synchronization signal/physical broadcast channel (SS/PBCH) block, and may periodically check whether a beam failure has occurred based on the reference signal or the SS/PBCH block. Also, the terminal may search for new candidate beam(s) when the beam failure is detected. The new candidate beam identification step may be performed after or before the beam failure detection step. Alternatively, the new candidate beam identification step may be performed together with the beam failure detection step.

The terminal may transmit a beam failure recovery request signal to the base station using the beam (i.e., the searched beam) identified in the new candidate beam identification step, and may receive a beam failure recovery response signal, which is a response to the beam failure recovery request signal, from the base station through the beam identified in the new candidate beam identification step. Also, the beam identified in the new candidate beam identification step may be used for transmission and reception of control channels and/or data channels until an optimal beam is configured.

When the beam failure is detected and the new candidate beam is identified, the terminal may transmit the beam failure recovery request signal to the base station through a contention-free physical random access channel (PRACH), and may perform a monitoring operation in a preconfigured duration in order to receive the beam failure recovery response signal. An interval between a transmission time point of the beam failure recovery request signal and a starting time point of the preconfigured period may be 4 slots. The base station may receive the beam failure recovery request signal from the terminal, and may transmit the beam failure recovery response signal to the terminal within the preconfigured period.

When the beam failure recovery response signal is received from the base station within the preconfigured period, the terminal may determine that the beam failure has been recovered. In this case, the terminal may receive control information from the base station through the beam used for transmitting the beam failure recovery request signal, and may configure a new beam with the base station based on the received control information. Alternatively, the terminal may perform data transmission/reception procedures with the base station based on resource allocation information included in the received control information.

Next, detailed operations of the communication node (e.g., base station and terminal) in the beam failure detection step, the new candidate beam identification step, the beam failure recovery request step, and the beam failure recovery response step will be described.

■ Beam Failure Detection Step

A reference signal used to detect a beam failure may be defined as a beam failure detection RS (BFD-RS). One or more reference signals among CSI-RS, DM-RS, PT-RS, and CRS may be used as the BFD-RS. Alternatively, the SS/PBCH block may be used as the BFD-RS.

When the CSI-RS is used as the BFD-RS, the base station may transmit to the terminal an RRC message including information indicating that CSI-RS resource(s) is to be used for the BFD-RS. The terminal may receive the RRC message from the base station, and may determine that the CSI-RS resource(s) configured by the base station is used for the BFD-RS based on the information included in the RRC message. In this case, the base station may use the same beam as a beam used for transmission of a control channel (e.g., DM-RS for the control channel) to transmit the CSI-RS through the CSI-RS resource(s) used for the BFD-RS. The terminal may perform a monitoring operation to receive the CSI-RS through the CSI-RS resource(s) used for the BFD-RS by using the same beam as the beam used for reception of the control channel (e.g., DM-RS for the control channel).

Here, the CSI-RS resource(s) may have a spatial quasi co-location (QCL) relationship with the DM-RS for the control channel. The base station may transmit to the terminal downlink control information (DCI) including a transmission configuration indication (TCI) indicating information on the CSI-RS resource(s) having a spatial QCL relationship with the DM-RS for the control channel. The terminal may receive the DCI from the base station, and identify the CSI-RS resource(s) having a spatial QCL relationship with the DM-RS for the control channel based on the TCI included in the DCI.

That is, the CSI-RS resource(s) having a spatial QCL relationship with the DM-RS for the control channel may be configured through at least one of the RRC message and the DCI. When the RRC message indicating the CSI-RS resource(s) having a spatial QCL relationship with the DM-RS for the control channel is not received, the terminal may transmit the CSI-RS or the SS/PBCH block indicated by the TCI included in the DCI as the BFD-RS.

The terminal may measure a radio link quality of the control channel using the BFD-RS (e.g., CSI-RS or SS/PBCH block configured as the BFD-RS). The radio link quality may be a hypothetical block error rate (BLER). For example, when the hypothetical BLER measured based on the BFD-RS is larger than a preset threshold value $Q_{out\_LR}$, the terminal may determine that the radio link of the corresponding beam is disconnected. The threshold $Q_{out\_LR}$ may be an out-of-synchronization threshold used in radio link monitoring (RLM).

The beam may be configured for each control resource set (CORESET). For example, one beam for one CORESET may be configured. If multiple CORESETs are configured, the base station may transmit a control channel using multiple beams. If the control channel is transmitted using multiple beams, the terminal may determine that a beam failure has occurred when the radio link qualities for all the beams used for transmission of the control channel is greater than the threshold $Q_{out\_LR}$.

However, since a complicated beam failure recovery procedure should be performed in order to recover the beam failure, it may be inefficient for the terminal to determine the occurrence of the beam failure based on one measurement result. Thus, the beam failure may be determined based on several measurement results. When a result of one measurement for the BFD-RS is larger than the threshold value $Q_{out\_LR}$, the terminal may determine that one beam failure instance has occurred. The occurrence of the beam failure instance may be determined by a physical (PHY) layer (e.g., a PHY entity performing a PHY layer function) or a medium access control (MAC) layer (e.g., a MAC layer entity performing a MAC layer function) belonging to the communication node. The MAC layer may determine that a beam failure has occurred when beam failure instances have occurred more than a preconfigured number of times.

In order for the MAC layer to determine the beam failure, the PHY layer belonging to the communication node may recognize whether the beam failure instance has occurred or not based on the measurement result of the radio link quality, and report to the MAC layer information related to the beam failure instance (e.g., information indicating that the beam failure instance has occurred, the measurement result of the radio link quality, and an index of the beam). The information related to the beam failure instance may be referred to as 'instance information'. The instance information may be periodically reported from the PHY layer to the MAC layer. For example, when it is determined that the beam failure instance has occurred, the PHY layer may transmit the instance information to the MAC layer. When it is determined that the beam failure instance has not occurred, the PHY layer may not transmit the instance information to the MAC layer.

The MAC layer may have a timer and a counter to determine the occurrence of the beam failure. The timer may be used to reset the counter, and the counter may be used to calculate the number of consecutive beam failure instances. When the timer expires, the counter may be reset. In this case, the counter may be set to '0'. The MAC layer may reset the timer and increment the counter whenever the instance information is received from the PHY layer. When the timer is reset, the timer may be set to an initial value. The MAC layer may determine that a beam failure has occurred when the incremented counter reaches a preconfigured value.

The value used for determining the beam failure may be preconfigured by the base station, and the base station may transmit the preconfigured value using one or more of an RRC message, a MAC control element (CE), and a DCI. Alternatively, the value used for determining the beam failure may be preconfigured to a fixed value between the base station and the terminal. When the timer expires without receiving the instance information, the MAC layer may reset the counter. The length of the timer may be determined based on a reporting periodicity of the instance information.

On the other hand, when multiple beams are used, a transmission period of the BFD-RS for each of the beams may be different. In this case, the following problems may occur in the beam failure detection step.

Figure 4:
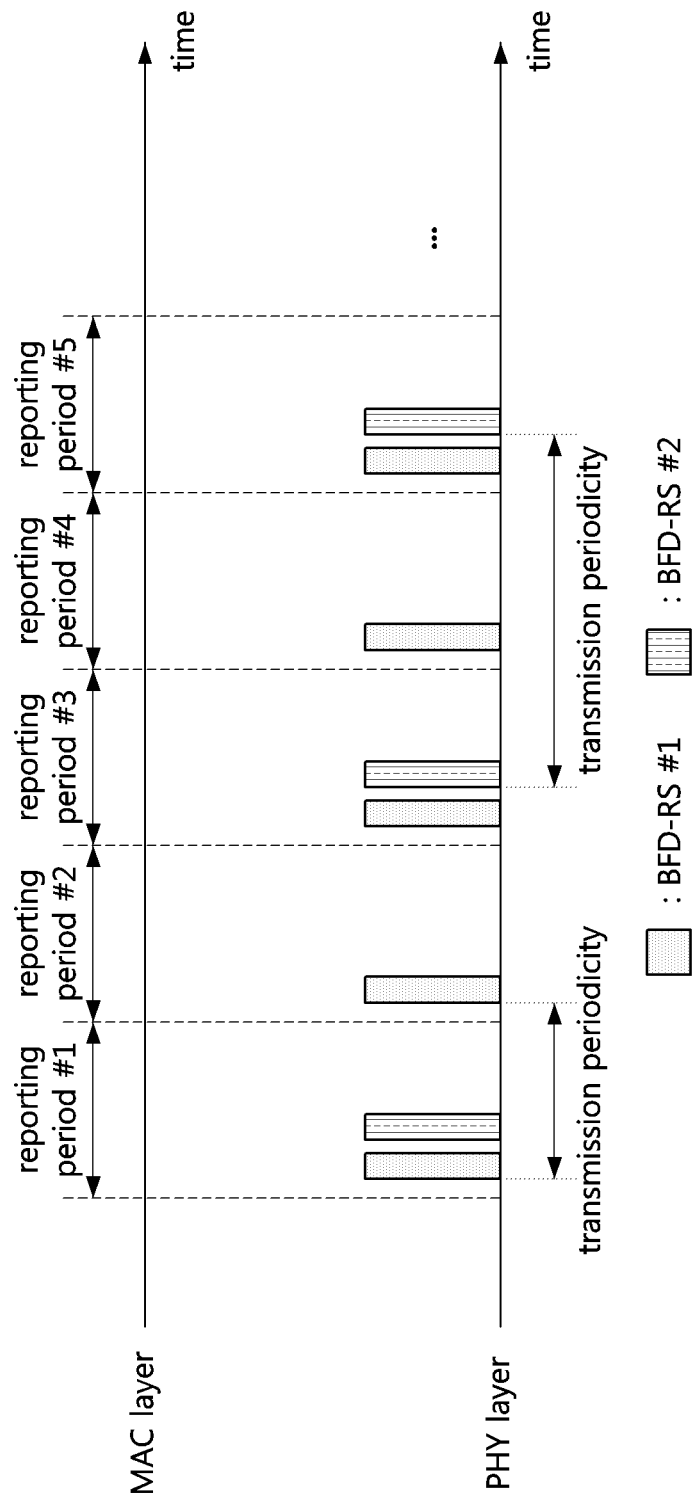
FIG. 4 is a timing diagram illustrating a first embodiment of a beam failure detection step in a communication system.

FIG. 4 is a timing diagram illustrating a first embodiment of a beam failure detection step in a communication system.

Referring to FIG. 4, when a control channel is transmitted using two beams (e.g., beam #1 and beam #2), two BFD-RSs (e.g., BFD-RS #1 and BFD-RS #2) for the two beams may be configured. In this case, the base station may transmit the BFD-RS #1 using the beam #1 and the BFD-RS #2 using the beam #2. A transmission periodicity of the BFD-RS #1 may be different from a transmission periodicity of the BFD-RS #2. Here, when measurement results (e.g., error rates) of the BFD-RSs (e.g., BFD-RS #1 and BFD-RS #2) of all the beams (e.g., beam #1 and beam #2) are greater than the threshold value $Q_{out\_LR}$, the PHY layer may determine that a beam failure instance has occurred, and may report the instance information to the MAC layer.

However, since the transmission periodicity of the BFD-RS #1 is different from the transmission periodicity of the BFD-RS #2, the PHY layer may not receive all the BFD-RSs in a specific reporting period (e.g., reporting period #2 and reporting period #4). Therefore, even when the measurement result (e.g., error rate) of one received BFD-RS (e.g., BFD-RS #1) in a specific reporting period is greater than the threshold value $Q_{out\_LR}$, the PHY layer may determine that a beam failure instance has not occurred.

In this case, the instance information may not be reported from the PHY layer to the MAC layer in the specific reporting period. Also, the MAC layer may reset the counter when the timer expires at the specific reporting period, since the instance information is not received from the PHY layer. That is, although a beam failure has actually occurred, the MAC layer may not determine that the beam failure has occurred. In order to solve such the problem, the PHY layer and MAC layer may operate as follows.

√ Scheme 1

When measurement results (e.g., error rates) of all the BFD-RSs (e.g., BFD-RS #1 and BFD-RS #2) received in a reporting period are greater than the threshold value $Q_{out\_LR}$, the PHY layer may determine that a beam failure instance has occurred, and may report the instance information to the MAC layer. When only a part (e.g., BFD-RS #1) of the BFD-RSs is received in a specific reporting period (e.g., reporting period #2 and reporting period #4) and the measurement result (e.g., error rate) of the BFD-RS #1 is greater than the threshold value $Q_{out\_LR}$, the PHY layer may determine that a partial beam failure instance has occurred. In this case, the PHY layer may report the instance information to the MAC layer together with a flag indicating resetting of the timer without increasing the counter. When the flag and instance information are received from the PHY layer, the MAC layer may determine that a partial beam failure instance has occurred, and may reset the timer without increasing the counter based on the flag.

√ Scheme 2

The instance information reported from the PHY layer to the MAC layer may further include information indicating a BFD-RS having a BLER larger than the threshold value $Q_{out\_LR}$ (e.g., a beam index or TCI indicating a beam through which the BFD-RS is transmitted).

For example, when measurement results of all the BFD-RSs (e.g., BFD-RS #1 and BFD-RS #2) received in a reporting period #1 are greater than the threshold value $Q_{out\_LR}$, the PHY layer may report to the MAC layer instance information including information indicating the BFD-RS #1 and information indicating the BFD-RS #2. Alternatively, the PHY layer may report instance information #1 including information indicating BFD-RS #1 and instance information #2 including information indicating BFD-RS #2 to the MAC layer. The MAC layer may receive the instance information (or, the instance information #1 and the instance information #2) from the PHY layer, and may determine that a beam failure instance has occurred based on the instance information (or, the instance information #1 and the instance information #2). In this case, the MAC layer may increase the counter and reset the timer.

For example, when a measurement result (e.g., error rate) of a part (e.g., BFD-RS #1) of the BFD-RSs received in a reporting period #2 is greater than the threshold value $Q_{out\_LR}$, the PHY layer may report to the MAC layer instance information including information indicating the BFD-RS #1. The MAC layer may receive the instance information from the PHY layer and may determine that a partial beam failure instance has occurred based on the information included in the instance information. In this case, the MAC layer may reset the timer without increasing the counter.

√ Scheme 3

The base station may adjust the length of a reporting period so that the radio link qualities can be measured based on all the BFD-RSs in one reporting period. The length of the reporting period may be set to be longer than the longest transmission periodicity among the transmission periodicities of all the BFD-RSs. The base station may transmit information indicating the configured reporting period using one or more of RRC message, MAC CE, and DCI. The terminal may confirm the reporting period configured by the base station by receiving the RRC message, MAC CE, or DCI, and measure the radio link quality based on the received BFD-RS in the report period.

■ New Candidate Beam Identification Step

The new candidate beam identification step may be performed concurrently with the beam failure detection step. When a beam failure is detected and a new candidate beam(s) is identified, the terminal may transmit a beam failure recovery request signal. Therefore, in order to search for a new candidate beam(s) when a beam failure occurs, the terminal may receive reference signals and/or SS/PBCH blocks from the base station.

The reference signal used to detect the new candidate beam may be defined as a new beam identification (NBI) RS (NBI-RS). One or more reference signals of CSI-RS, DM-RS, PT-RS, and CRS may be used as the NBI-RS. Alternatively, the SS/PBCH block may be used as the NBI-RS.

When the CSI-RS is used as the NBI-RS, the base station may transmit to the terminal an RRC message including information indicating that CSI-RS resource(s) is to be used for the NBI-RS. The terminal may receive the RRC message from the base station, and may determine that the CSI-RS resource(s) configured by the base station is used for the NBI-RS based on the information included in the RRC message. Alternatively, when the SS/PBCH block is used as the NBI-RS, the base station may transmit an RRC message to the terminal, which includes information indicating that the SS/PBCH block is to be used for the NBI-RS. The terminal may receive the RRC message from the base station, and may determine that the SS/PBCH block is to be used for the NBI-RS based on the information included in the RRC message.

The NBI-RS may be transmitted through a candidate beam(s) used for transmission and reception of a data channel as well as a control channel. The NBI-RS may have a spatial QCL relationship with a DM-RS for a control channel or a data channel (e.g., a data channel before beam reconfiguration). In this case, the base station may use the same beam as that used for transmission of a control channel (e.g. DM-RS for the control channel) or a data channel (e.g. DM-RS for the data channel) to transmit the NBI-RS. The terminal may use the same beam as that used for the reception of a control channel (e.g. DM-RS for the control channel) or a data channel (e.g., DM-RS for the data channel) to perform a monitoring operation for reception of the NBI-RS.

The terminal may receive the NBI-RS, and measure the quality of the beam based on the NBI-RS. The quality of the beam may be an L1-reference signal received power (L1-RSRP). The L1-RSRP may be an RSRP measured at the PHY layer. For example, when the L1-RSRP measured based on the NBI-RS is larger than a preconfigured threshold value $Q_{in\_LR}$, the terminal may determine the beam used for transmission of the corresponding NBI-RS as a new candidate beam. The threshold value $Q_{in\_LR}$ may be transmitted from the base station to the terminal through an RRC message. When a plurality of beams having an L1-RSRP larger than the threshold value $Q_{in\_LR}$ are identified, the MAC layer may determine one or more beams among the plurality of identified beams as new candidate beam(s).

Therefore, the PHY layer may configure a set of a plurality of beams having an L1-RSRP larger than the threshold value $Q_{in\_LR}$ (hereinafter referred to as a 'candidate beam set'). The candidate beam set may include all or some of the beams having an L1-RSRP greater than the threshold $Q_{in\_LR}$. The PHY layer may transmit indexes of the respective beams belonging to the candidate beam set (or, indexes of the respective NBI-RSs transmitted through the beams belonging to the candidate beam set) and/or the L1-RSRPs of the respective beams belonging to the candidate beam set to the MAC Layer. The MAC layer may receive the indexes of the respective beams belonging to the candidate beam set (or, indexes of the respective NBI-RSs transmitted through the beams belonging to the candidate beam set) and/or the L1-RSRPs of the respective beams belonging to the candidate beam set, and based on the received information, the MAC layer may determine one or more beams among the beams belonging to the candidate beam set as the new candidate beam(s).

■ Beam Failure Recovery Request Step

When a beam failure is detected and at least one new candidate beam is identified, the terminal may declare a beam failure. The terminal may transmit a beam failure recovery request signal after declaring the beam failure. The beam failure recovery request signal may be transmitted according to a recovery timer and the maximum number of recovery requests. The recovery timer and the maximum number of recovery requests may be configured by the base station, and the base station may transmit an RRC message to the terminal, including the recovery timer and the maximum number of recovery requests. The terminal may confirm the recovery timer and the maximum number of recovery requests by receiving the RRC message. For example, when a beam failure is declared, the recovery timer may operate and the terminal may transmit a beam failure recovery request signal to the base station.

In this case, the terminal may transmit the beam failure recovery request signal to the base station through a PRACH by using the new candidate beam. The beam failure recovery request signal may be transmitted based on the contention-free RA scheme. The terminal may retransmit the beam failure recovery request signal until the terminal receives a beam failure recovery response signal, which is a response to the beam failure recovery request signal, from the base station.

A PRACH resource (e.g., a time-frequency resource of the PRACH, preamble ID) used for transmission of the beam failure recovery request signal may be associated with the new candidate beam (e.g., NBI-RS transmitted through the new candidate beam). The base station may transmit information on the PRACH resource associated with the NBI-RS to the terminal through an RRC message. The terminal may confirm the information on the PRACH resource associated with the NBI-RS by receiving the RRC message, and may transmit the beam failure recovery request signal based on the information on the PRACH resource.

■ Beam Failure Recovery Response Step

When the beam failure recovery request signal is received from the terminal, the base station may transmit a beam failure recovery response signal to the terminal, which is a response to the beam failure recovery request signal. The beam failure recovery response signal may be transmitted through a preconfigured CORESET. The CORESET used for transmission of the beam failure recovery response signal may be referred to as a 'CORESET-beam failure recovery (CORESET-BFR)'. The beam used for transmission of the beam failure recovery response signal may be the new candidate beam determined in the new candidate beam identification step. That is, the beam used for transmission of the beam failure recovery response signal may be associated with the beam used for receiving the beam failure recovery request signal.

Figure 5:
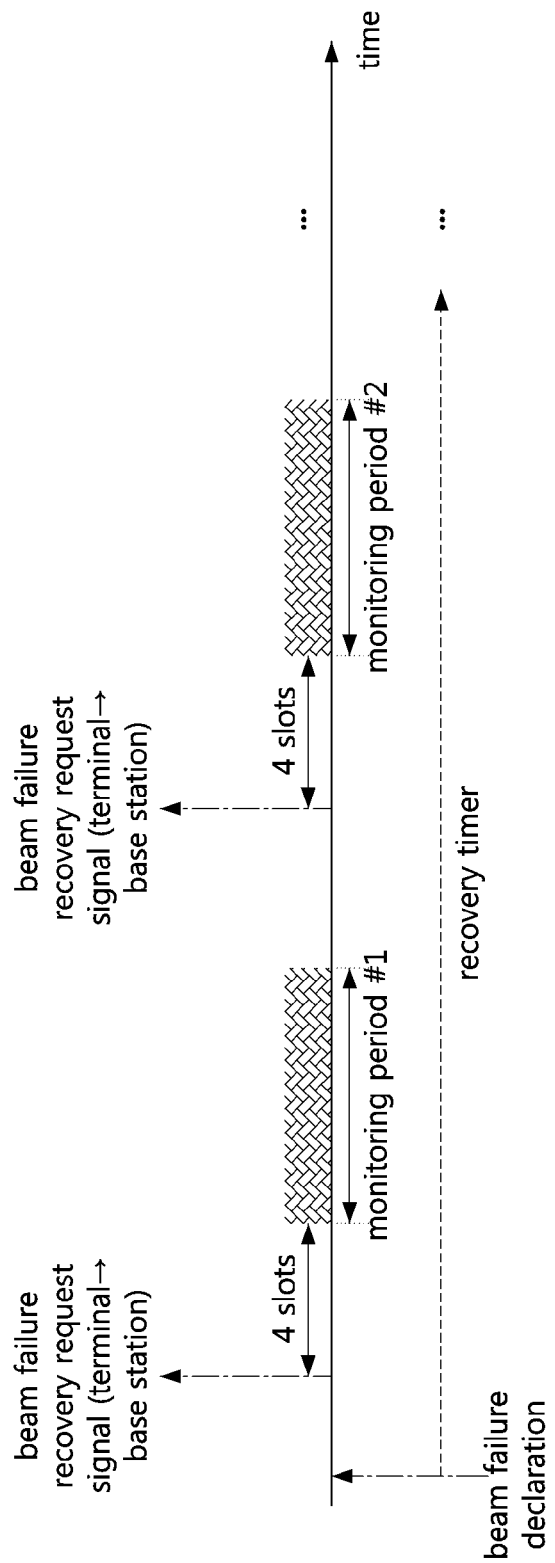
FIG. 5 is a timing diagram illustrating a first embodiment of a beam failure recovery response step in a communication system.

FIG. 5 is a timing diagram illustrating a first embodiment of a beam failure recovery response step in a communication system.

Referring to FIG. 5, the terminal may transmit a beam failure recovery request signal in a slot #n after declaring a beam failure. n may be an integer equal to or greater than 0. The terminal may perform a monitoring operation from a slot #(n+4) to receive a beam failure recovery response signal, which is a response to the beam failure recovery request signal. The length of the monitoring period for the beam failure recovery response signal may be configured by the base station and the base station may transmit information indicating the monitoring period for the beam failure recovery response signal through an RRC message. The terminal may confirm the monitoring period for the beam failure recovery response signal by receiving the RRC message from the base station.

When the beam failure recovery response signal is not received within the monitoring period, the terminal may retransmit the beam failure recovery request signal. The retransmission procedure of the beam failure recovery request signal may be performed until the expiration of the recovery timer. Also, if the number of transmissions of the beam failure recovery request signal reaches the maximum number of recovery requests before the expiration of the recovery timer, the terminal may stop the retransmission procedure of the beam failure recovery request signal.

If the beam failure recovery response signal is not received before expiration of the recovery timer, the terminal may determine that the beam failure recovery procedure has failed. Also, if the number of transmissions of the beam failure recovery request signal reaches the maximum number of recovery requests before the expiration of the recovery timer, the terminal may determine that the beam failure recovery procedure has failed. When it is determined that the beam failure recovery procedure has failed, a radio link failure recovery procedure may be performed. If the beam failure recovery response signal is received before expiration of the recovery timer, the beam failure recovery procedure may be completed. In this case, the communication node (e.g., the base station and the terminal) may use the beam (e.g., the beam determined in the new candidate beam identification step) recovered in the beam failure recovery procedure to perform transmission and reception procedures of control channels and data channels until configuration of a new beam.

■ Multiple Beam Recovery Procedure

In the beam failure recovery procedure, one beam may be recovered, the terminal may receive a control channel from the base station through the recovered beam, and perform a beam management procedure based on the information included in the control channel so as to configure multiple beams. In this case, it may take a lot of time to configure multiple beams.

In the new candidate beam identification step, the terminal measures the qualities of the beams, so that the terminal is able to identify whether multiple beams can be configured based on the measured qualities. Thus, when the terminal is able to report to the base station that the multiple beams can be configured, the base station may easily configure the multiple beams. That is, even when beam management/reporting information for multi-beam configuration is not configured by the base station, the terminal may report information for multi-beam configuration (hereinafter referred to as 'multi-beam configuration information') to the base station. The multi-beam configuration information may include information indicating that multiple beams can be configured. Also, the multi-beam configuration information may further include at least one of indexes of configurable beams and qualities (e.g., L1-RSRPs) of them. The procedure of reporting the multi-beam configuration information may be performed as follows.

Figure 6:
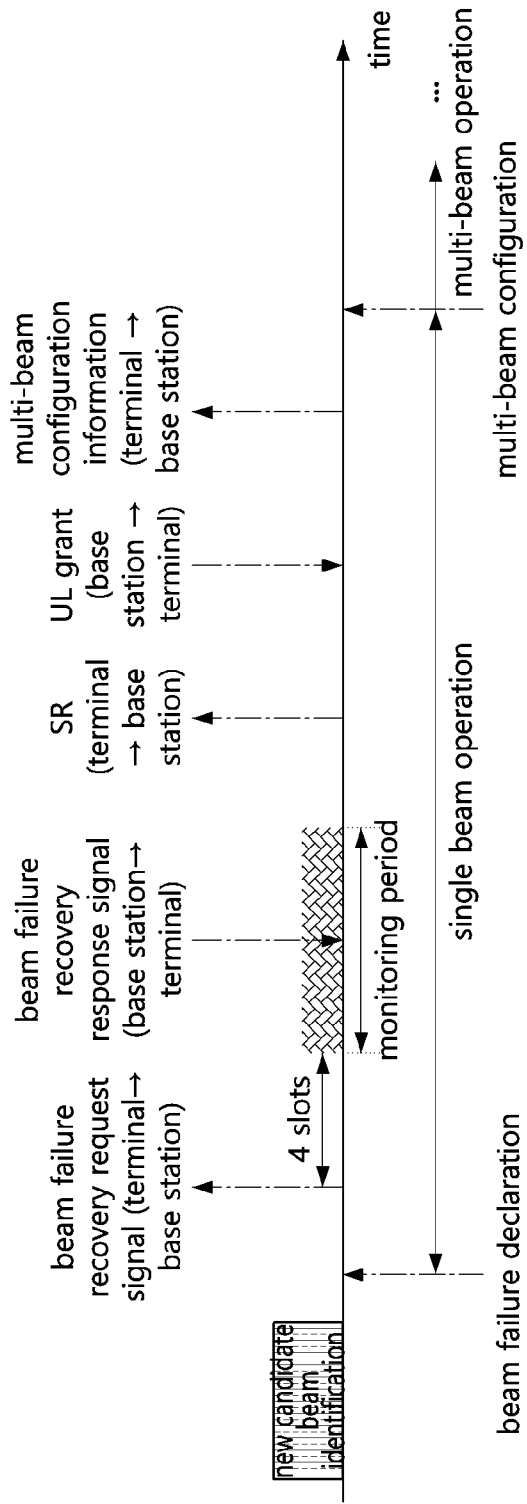
FIG. 6 is a timing diagram illustrating a first embodiment of a multi-beam recovery procedure in a communication system.

FIG. 6 is a timing diagram illustrating a first embodiment of a multi-beam recovery procedure in a communication system.

Referring to FIG. 6, when the beam failure recovery procedure is completed, the terminal may transmit to the base station a scheduling request (SR) for the multi-beam configuration information through an uplink channel (e.g., a PUCCH or a physical uplink shared channel (PUSCH)). Even when a beam failure occurs, since uplink connection between the base station and the terminal can be maintained, the SR may be transmitted through the uplink channel. Alternatively, when the beam failure recovery response signal includes an UL grant, the SR for the multiple beam configuration information may be transmitted through an uplink channel indicated by the UL grant.

The base station may receive the SR from the terminal, and allocate a resource for uplink transmission based on the SR. The base station may transmit the UL grant including resource allocation information to the terminal through a control channel (e.g., PDCCH). The UL grant may be included in a DCI. The terminal may receive the UL grant from the base station, and may transmit the multi-beam configuration information (e.g., indexes and/or qualities of configurable beams) through the uplink channel (e.g., PUSCH) indicated by the UL grant. The multi-beam configuration information may be included in a MAC CE, and the MAC CE including the multi-beam configuration information may be transmitted through the PUSCH.

The base station may receive the multi-beam configuration information from the terminal, and may determine that multiple beams can be configured based on the multi-beam configuration information. Thus, multiple beams for communications between the base station and the terminal may be configured.

Figure 7:
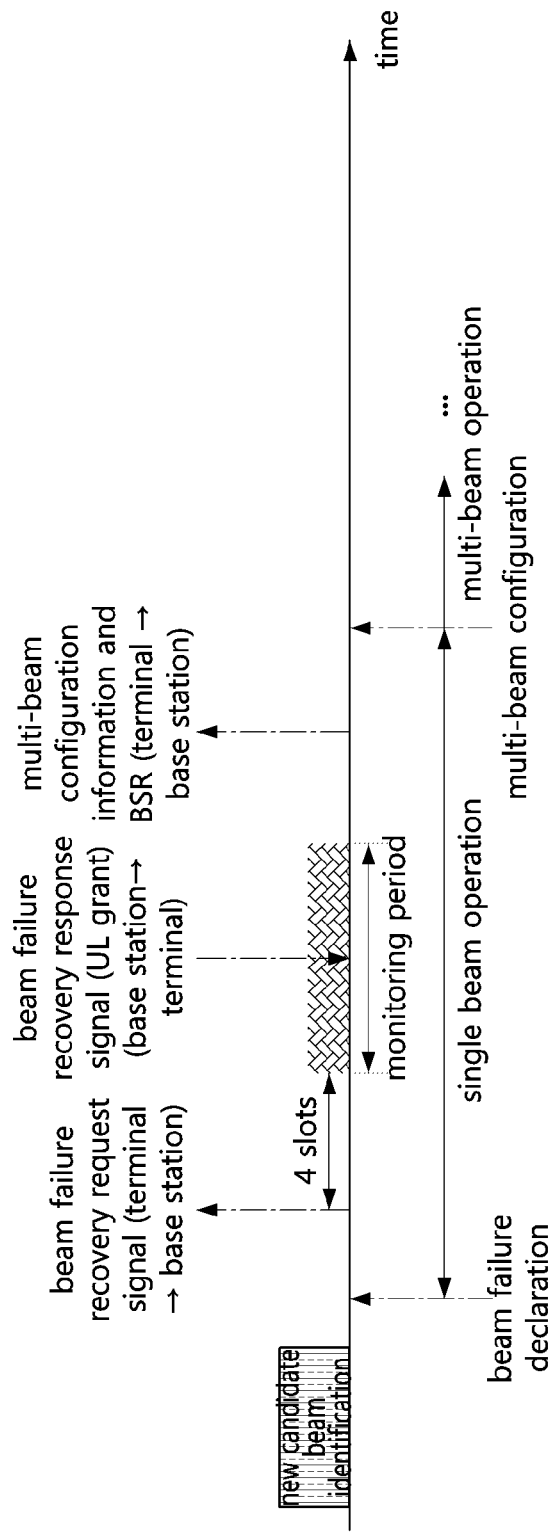
FIG. 7 is a timing diagram illustrating a second embodiment of a multi-beam recovery procedure in a communication system.

FIG. 7 is a timing diagram illustrating a second embodiment of a multi-beam recovery procedure in a communication system.

Referring to FIG. 7, in the beam failure recovery procedure, the base station may transmit a beam failure recovery response signal including an UL grant to the terminal. The terminal may receive the beam failure recovery response signal from the base station and identify the UL grant included in the beam failure recovery response signal. The terminal may transmit to the base station multi-beam configuration information (e.g., indexes and/or qualities of configurable beams) together with a buffer status report (BSR) through an uplink channel (e.g., PUSCH) indicated by the UL grant. The BSR and the multi-beam configuration information may be included in a MAC CE, and the MAC CE including the BSR and multi-beam configuration information may be transmitted through the PUSCH.

The base station may receive the BSR and multi-beam configuration information from the terminal, and may determine that multiple beams can be configured based on the multi-beam configuration information. Thus, multiple beams for communications between the base station and the terminal may be configured.

Figure 8:
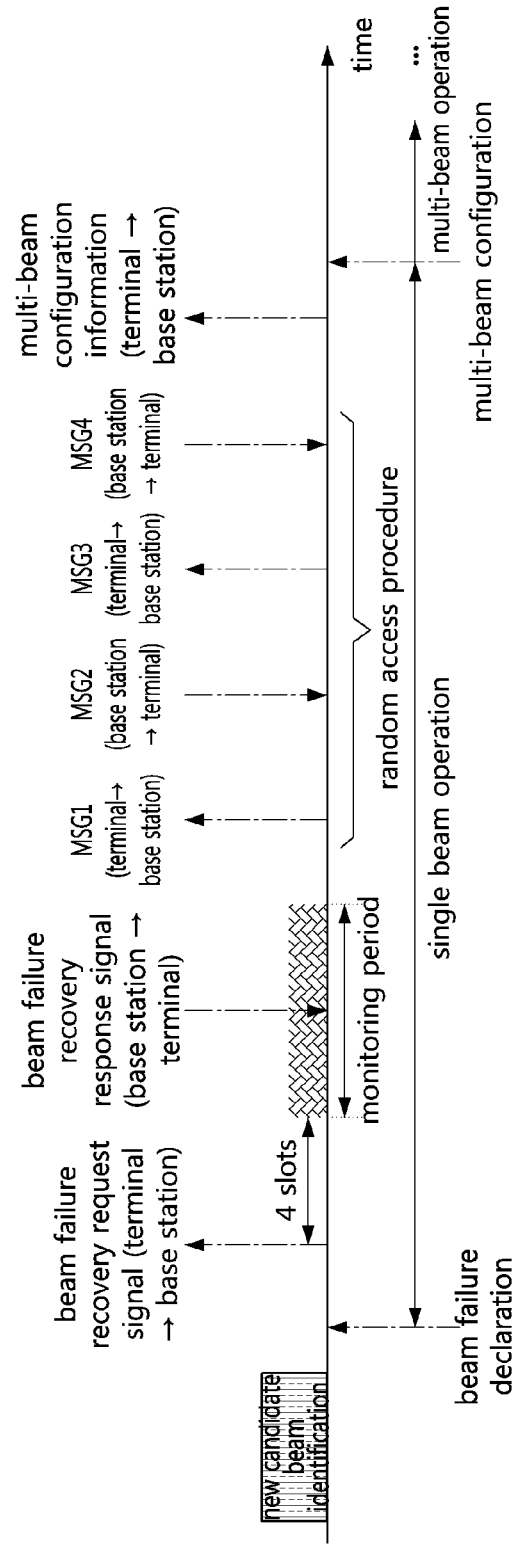
FIG. 8 is a timing diagram illustrating a third embodiment of a multi-beam recovery procedure in a communication system.

FIG. 8 is a timing diagram illustrating a third embodiment of a multi-beam recovery procedure in a communication system.

Referring to FIG. 8, when an uplink channel (e.g., PUCCH or PUSCH) is not configured in the beam failure recovery procedure or when an uplink connection between the base station and the terminal is released, after completing the beam failure recovery procedure, the terminal may establish an uplink connection between the base station and the terminal by performing a random access procedure with the base station. The terminal may transmit multi-beam configuration information (e.g., indexes and/or qualities of configurable beams) to the base station through an uplink channel (e.g., PUSCH) configured by the random access procedure. The multi-beam configuration information may be included in a MAC CE, and the MAC CE including the multi-beam configuration information may be transmitted through the PUSCH. Further, the multi-beam configuration information may be transmitted to the base station together with the BSR.

The base station may receive the multi-beam configuration information from the terminal, and may determine that multiple beams can be configured based on the multi-beam configuration information. Thus, multiple beams for communications between the base station and the terminal may be configured.

Figure 9:
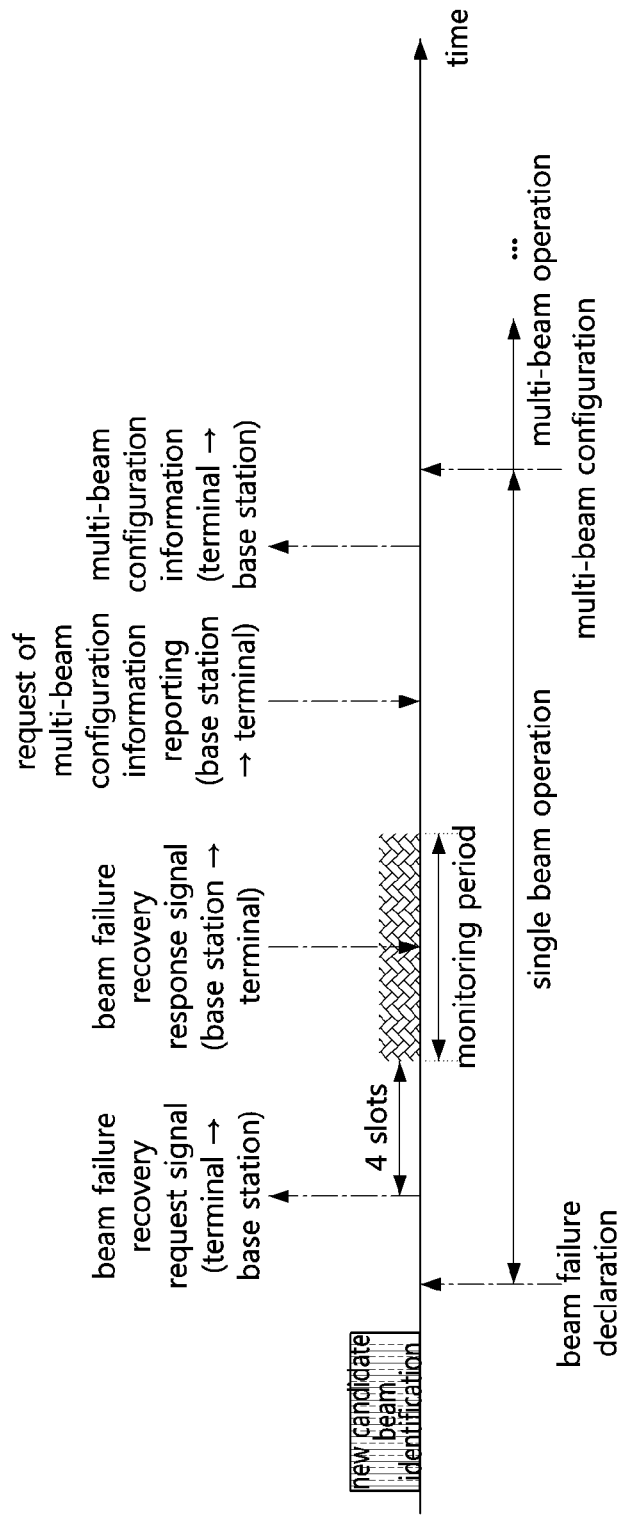
FIG. 9 is a timing diagram illustrating a fourth embodiment of a multi-beam recovery procedure in a communication system.

FIG. 9 is a timing diagram illustrating a fourth embodiment of a multi-beam recovery procedure in a communication system.

Referring to FIG. 9, when the beam failure recovery procedure is completed, the base station may transmit information requesting reporting of multi-beam configuration information to the terminal through a downlink channel (e.g., PDSCH). The information requesting reporting of multi-beam configuration information may be included in a MAC CE. That is, the information requesting reporting of multi-beam configuration information may be transmitted through the MAC CE instead of an RRC message. Resource allocation information of the downlink channel for transmission of the information requesting reporting of multi-beam configuration information may be transmitted through the beam failure recovery response signal in the beam failure recovery procedure.

The terminal may receive the information requesting reporting of multi-beam configuration information from the base station, and may transmit multi-beam configuration information (e.g., indexes and/or qualities of configurable beams) through an uplink channel (e.g., PUCCH or PUSCH) to the base station. Resource allocation information indicating the uplink channel for transmission of the multi-beam configuration information may be received together with the information requesting reporting of multi-beam configuration information.

The base station may receive the multi-beam configuration information from the terminal, and may determine that multiple beams can be configured based on the multi-beam configuration information. Thus, multiple beams for communications between the base station and the terminal may be configured.

Figure 10:
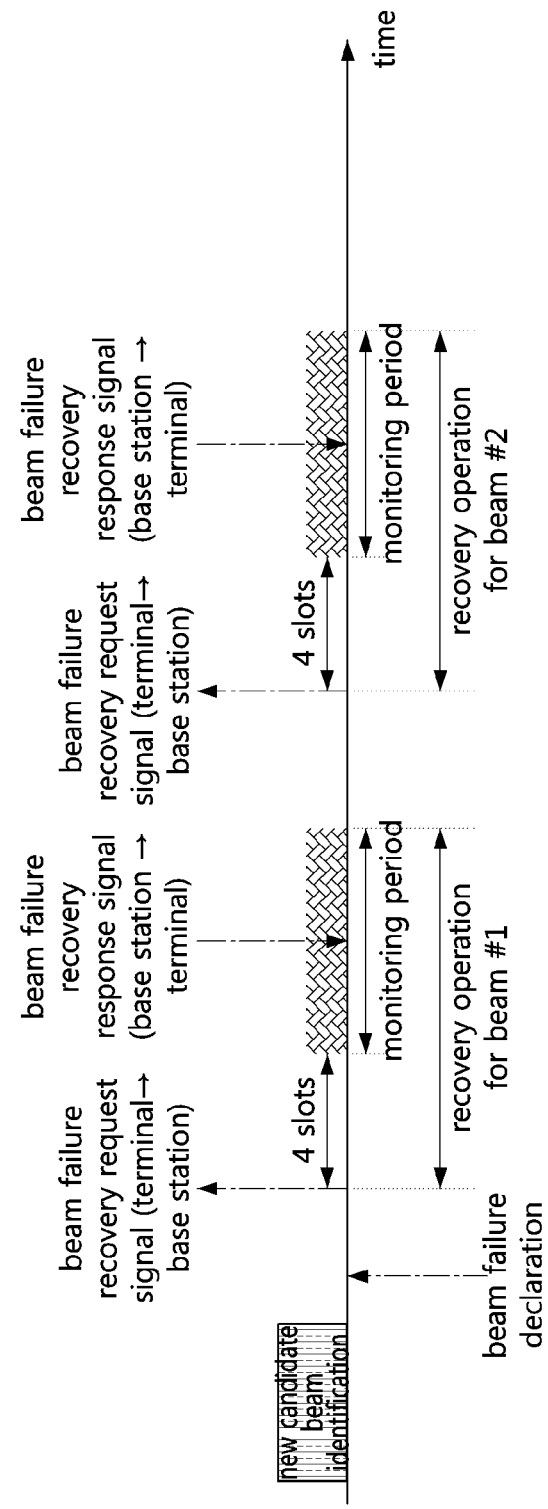
FIG. 10 is a timing diagram illustrating a fifth embodiment of a multi-beam recovery procedure in a communication system.

FIG. 10 is a timing diagram illustrating a fifth embodiment of a multi-beam recovery procedure in a communication system.

Referring to FIG. 10, in the new candidate beam identification step, a plurality of beams (e.g., beam #1 and beam #2) may be configured as new candidate beams. In this case, the terminal may transmit a beam failure recovery request signal to the base station using each of the new candidate beams (e.g., beam #1 and beam #2). The base station may receive the beam failure recovery request signal through the beam #1 and may transmit a beam failure recovery response signal in response to the beam failure recovery request signal by using the beam #1. The base station may receive the beam failure recovery request signal through the beam #2 and may transmit a beam failure recovery response signal in response to the beam failure recovery request signal by using the beam #2. The terminal may receive the beam failure recovery response signal through the beam #1 and the beam #2, respectively. Thus, multiple beams (e.g., beam #1 and beam #2) may be recovered through the beam failure recovery procedure.

Here, the transmission and reception procedure of the beam failure recovery request and response signals through the beam #1 may be performed independently of the transmission and reception procedure of the beam failure recovery request and response signals through the beam #2. A PRACH resource for the beam #1 may be configured independently of a PRACH resource for the beam #2. Each of the recovery timer and the maximum number of recovery requests for the beam #1 may be configured independently of each the recovery timer and the maximum number of recovery requests for the beam #2.

Figure 11:
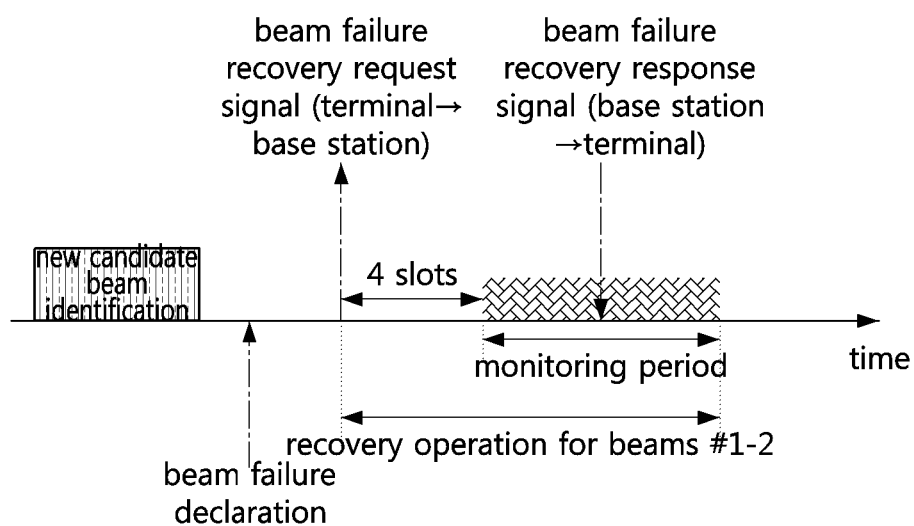
FIG. 11 is a timing diagram illustrating a sixth embodiment of a multi-beam recovery procedure in a communication system.

FIG. 11 is a timing diagram illustrating a sixth embodiment of a multi-beam recovery procedure in a communication system.

Referring to FIG. 11, when the number of beams to be configured as new candidate beams is not expected to be large, the number of combinations of beams configurable as multiple beams may not be large. For example, when beams #1 to #3 are expected to be configured as new candidate beams, the beam combinations may be configured as shown in Table 1 below.

TABLE 1

|  | Beams included in a beam combination |
|---|---|
| Beam combination #1 | Beam #1 and Beam #2 |
| Beam combination #2 | Beam #1 and Beam #3 |
| Beam combination #3 | Beam #2 and Beam #3 |

The base station may configure a PRACH resource (e.g., time-frequency resource and preamble ID of PRACH) for each beam combination. For example, the PRACH resource for the beam combination #1 may be different from the PRACH resource for the beam combination #2 or the beam combination #3. The base station may transmit information on the PRACH resource for each beam combination to the terminal through an RRC message. The terminal may confirm the information on the PRACH resource for each beam combination by receiving the RRC message.

When the beam #1 and the beam #2 are determined as new candidate beams in the new candidate beam identification step, the terminal may transmit a beam failure recovery request signal to the base station through a PRACH configured for the beam combination #1. The beam failure recovery request signal may be transmitted using a beam determined according to a preconfigured rule among the multiple beams. The preconfigured rule may be one of the following rules.

Rule #1: The beam failure recovery request message is transmitted through a beam having a low index among the multiple beams.
Rule #2: The beam failure recovery request message is transmitted through a beam having a high index among the multiple beams.
Rule #3: The beam failure recovery request message is transmitted through a beam having a low RSRP among the multiple beams.
Rule #4: The beam failure recovery request message is transmitted through a beam having a high RSRP among the multiple beams.

The base station may receive the beam failure recovery request signal from the terminal, and identify a beam combination (e.g., beam combination #1) in which multiple beams can be configured based on the PRACH resource through which the beam failure recovery request signal is received. The base station may transmit a beam failure recovery response signal to the terminal, which is a response to the beam failure recovery request signal. The beam used for transmission of the beam failure recovery response signal may be the same as the beam used for reception of the beam failure recovery request signal. The terminal may receive the beam failure recovery response signal from the base station. When the beam failure recovery procedure is completed, the multiple beams (e.g., beam #1 and beam #2) may be configured between the base station and the terminal.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A terminal in a communication system, comprising:
a processor,
wherein the processor causes the terminal to:
search for a plurality of candidate beams when a beam failure is detected;
transmit a beam failure recovery request signal to a base station using a beam #1 among the plurality of candidate beams;
receive from the base station a beam failure recovery response signal that is a response to the beam failure recovery request signal through the beam #1; and
when a beam failure recovery procedure for the beam #1 is succeed, perform a multi-beam configuration procedure using the beam #1 which is a beam recovered by the beam failure recovery procedure,
wherein, when the multi-beam configuration procedure is performed, the processor causes the terminal to:
transmit a scheduling request (SR) to the base station using the beam #1, the SR requesting a resource for transmission of multi-beam configuration information including index(es) of one or more beams excluding the beam #1, which is the beam recovered by the beam failure recovery procedure, among the plurality of candidate beams;
receive an uplink (UL) grant from the base station using the beam #1, the uplink grant being a response to the SR; and
transmit the multi-beam configuration information to the base station using a resource indicated by the UL grant and the beam #1.

2. The terminal according to claim 1, wherein the beam failure is detected based on a measurement result of a first reference signal configured by the base station, and the first reference signal has a quasi-co-location (QCL) relationship with a demodulation reference signal (DM-RS) of a control channel between the base station and the terminal.

3. The terminal according to claim 1, wherein the beam failure is determined to be detected when error rates of all beams used for transmitting and receiving a control channel between the terminal and the base station are larger than a preconfigured threshold, and when a part of all the beams are received within a monitoring period and error rates of the part of all the beams are larger than the preconfigured threshold, a physical (PHY) entity of the terminal transmits to a medium access control (MAC) entity of the terminal a flag indicating resetting of a timer without increasing a counter indicating a number of occurrences of beam failure instances.

4. The terminal according to claim 1, wherein the beam failure is determined to be detected when error rates of all beams used for transmitting and receiving a control channel between the terminal and the base station are larger than a preconfigured threshold, and when at least one beam among all the beams is received within a monitoring period, a PHY entity of the terminal transmits to a MAC entity of the terminal information indicating a beam(s) having an error rate larger than the preconfigured threshold.

5. The terminal according to claim 1, wherein the plurality of candidate beams are searched based on measurement results of second reference signals configured by the base station, and each of the second reference signals has a QCL relationship with a DM-RS of a control channel between the base station and the terminal.

6. The terminal according to claim 5, wherein the beam failure recovery request signal is transmitted through a physical random access channel (PRACH) associated with the second reference signal.

7. The terminal according to claim 1, wherein the beam failure recovery response signal is received through a control resource set (CORESET) configured by the base station.

8. The terminal according to claim 1, wherein the multi-beam configuration information further includes at least one of information indicating that multiple beams can be configured and information of qualities of the one or more beams.

9. The terminal according to claim 1, wherein the multi-beam configuration information is transmitted to the base station through a MAC control element (CE).

10. A terminal in a communication system, comprising:
a processor,
wherein the processor causes the terminal to:
search for a plurality of candidate beams when a beam failure is detected;
transmit a beam failure recovery request signal to a base station using a beam #1 among the plurality of candidate beams;
receive from the base station a beam failure recovery response signal including an uplink (UL) grant through the beam #1; and
when a beam failure recovery procedure for the beam #1 is succeed, perform a multi-beam configuration procedure using the beam #1 which is a beam recovered by the beam failure recovery procedure,
wherein, when the multi-beam configuration procedure is performed, the processor causes the terminal to:
transmit to the base station multi-beam configuration information including index(es) of one or more beams excluding the beam #1 among the plurality of candidate beams, by using a resource indicated by the UL grant and the beam #1.

11. The terminal according to claim 10, wherein the processor further causes the terminal to, after receiving the beam failure recovery response signal, receive a medium access control (MAC) control element (CE) requesting reporting of the multi-beam configuration information from the base station, wherein the multi-beam configuration information is transmitted when the MAC CE is received.

12. The terminal according to claim 10, wherein the beam failure is detected based on a measurement result of a first reference signal configured by the base station, and the first reference signal has a quasi-co-location (QCL) relationship with a demodulation reference signal (DM-RS) of a control channel between the base station and the terminal.

13. The terminal according to claim 10, wherein the plurality of candidate beams are searched based on measurement results of second reference signals configured by the base station, and each of the second reference signals has a QCL relationship with a DM-RS of a control channel between the base station and the terminal.

14. The terminal according to claim 10, wherein the multi-beam configuration information further includes at least one of information indicating that multiple beams can be configured and information of qualities of the one or more beams.

15. The terminal according to claim 10, wherein the multi-beam configuration information is transmitted to the base station together with a buffer status report (BSR).

16. A terminal in a communication system, comprising:
a processor,
wherein the processor causes the terminal to:
search for a plurality of candidate beams when a beam failure is detected;
transmit a first beam failure recovery request signal to a base station using a beam #1 among the plurality of candidate beams;
receive from the base station a first beam failure recovery response signal that is a response to the first beam failure recovery request signal through the beam #1;
when a beam failure recovery procedure for the beam #1 is succeed, perform a multi-beam configuration procedure for a beam #2 among the plurality of candidate beams; and
perform communication with the base station using multi-beam including the beam #1 and the beam #2,
wherein, when the multi-beam configuration procedure is performed, the processor causes the terminal to:
transmit a second beam failure recovery request signal to the base station using the beam #2 among the plurality of candidate beams; and
receive from the base station a second beam failure recovery response signal that is a response to the second beam failure recovery request signal through the beam #2.

17. The terminal according to claim 16, wherein the beam #1 is searched based on a measurement result of a first reference signal configured by the base station, the first reference signal has a quasi-co-location (QCL) relationship with a demodulation reference signal (DM-RS) for a control channel between the base station and the terminal, and the first beam failure recovery request signal is transmitted through a first physical random access channel (PRACH) associated with the first reference signal.

18. The terminal according to claim 17, wherein the first PRACH is configured for the beam #1 and a beam #3 among the plurality of candidate beams, and the first beam failure recovery request signal is a signal for requesting recovery of the beam #1 and the beam #3 which are associated with the first PRACH.

19. The terminal according to claim 17, wherein the first PRACH is configured independently of a second PRACH through which the second beam failure recovery request signal.

20. The terminal according to claim 16, wherein configuration information of a PRACH used for recovery of beam failures of two or more beams among the plurality of candidate beams is received from the base station through a radio resource control (RRC) message.

* * * * *